United States Patent [19]

Rotman et al.

[11] Patent Number: 5,004,489

[45] Date of Patent: Apr. 2, 1991

[54] PROCESS FOR PRODUCING A GLASS-METAL CONNECTION

[75] Inventors: Frédéric Rotman, Tokyo, Japan; Yannick Rancon, Velizy, France; Philippe Queille, Viroflay, France; Michel Olivier, Beynes, France

[73] Assignee: L'Air Liquide, Societe Anonyme Pour L'Etude et L'Exploitation des Procedes Georges Claude, Paris, France

[21] Appl. No.: 483,177

[22] Filed: Feb. 22, 1990

[30] Foreign Application Priority Data

Feb. 22, 1989 [FR] France ................................ 89 02277

[51] Int. Cl.$^5$ .............................................. C03C 27/02
[52] U.S. Cl. ..................................... 65/32.2; 65/59.1; 65/59.23; 148/278
[58] Field of Search ................. 65/32.2, 59.23, 59.1; 148/278

[56] References Cited

U.S. PATENT DOCUMENTS 2,043,307  6/1936  Scott ................................ 65/59.1 X
2,717,475  9/1955  McCarthy ........................... 65/32.2
4,445,920  5/1984  Smith ............................... 65/32.2 X
4,888,037  12/1989  Bandyopadhyay et al. ........ 65/32.2

Primary Examiner—Robert L. Lindsay
Attorney, Agent, or Firm—Browdy and Neimark

[57] ABSTRACT

The invention concerns glass-metal sealing comprising effecting on a metallic piece, in particular an alloy based on iron and nickel or iron, nickel and cobalt, first of all a decarburization under an atmosphere, at a temperature of between 950° C. and 1,150° C., formed by hydrogen (10 to 99%), water vapor (1 to 8%), with a ratio hydrogen/water vapor higher than five, the possible remainder being nitrogen, then an oxidation under an atmosphere formed by an inert vector gas such as nitrogen, either at a temperature of 600° C. to 800° C. and with a water vapor content of 8% to 2%; or at a temperature of 900° C. to 1,100° C. and with a water vapor content of 4% to 0.5%; then establishing the connection. The gas mixture for a treatment atmosphere is obtained by mixing nitrogen and hydrogen conducted through pipes (13, 14), to which oxygen is added through a pipe (15) upstream of a catalytic chamber (11) permitting the elimination of the oxygen and the production of a content of water vapor.

11 Claims, 1 Drawing Sheet

PROCESS FOR PRODUCING A GLASS-METAL CONNECTION

FIELD OF THE INVENTION

The present invention relates to a process for producing a glass-metal connection comprising effecting, on a piece of metal, in particular alloys based on iron and nickel or iron, nickel and cobalt, first a decarburization under an atmosphere, at a temperature on the order of 1000° C., formed by hydrogen and water vapour and, optionally, a complementary inert gas such as nitrogen, then an oxidation under an atmosphere, at high temperature, formed by water vapour and an inert vector gas such as nitrogen, optionally with a low content of hydrogen, and then establishing the connection or sealing between the piece of metal and the glass.

BACKGROUND OF THE INVENTION

The hermetic glass-metal connection has its principal application in the field of the electronic or electrotechnical industries for constructing enclosing boxes and hermetic electric passages. The metal is employed for its conductive properties, while the glass performs the function of an insulator. The connection between the glass and the metal must be both sealed and strong. The seal permits protecting the electronic or electrotechnical components from the exterior environment, while the mechanical resistance of the connection is necessary for resisting mounting or utilization stresses. Such a connection is usually obtained by one or more passages of the materials in heat treating furnaces operating under atmospheres.

Three treatments may be distinguished in succession.

First treatment: decarburization/degassing of the metal so as to avoid the formation of bubbles at the interface in the subsequent treatments, which would otherwise have an adverse effect on the mechanical resistance of the connection. This treatment is carried out at a temperature on the order of 1000° C. under an atmosphere which is decarburizing but reducing with respect to the metal, for example with a mixture of hydrogen and water vapour and, optionally, a complementary inert gas such as nitrogen. The decarburization of an alloy based on iron, nickel and cobalt was studied by M. R. Notis in an article entitled "Decarburization of an Iron-Nickel-Cobalt Glass Sealing Alloy" which appeared in the "Journal of the American Ceramic Society", volume 45, No. 9, Sept. 1962.

Second treatment: oxidation of the metal after decarburization/degassing so as to form a layer of oxide required for obtaining a chemical connection in the course of the third treatment. This oxidation is carried out at a high temperature under an atmosphere which is oxidizing with respect to the metal, for example with a mixture of water vapour and an inert gas such as nitrogen and, optionally, with a low content of hydrogen. The necessity of very precisely controlling the oxidizing power of the atmosphere was studied by R. P. Abendroth in an article entitled "Oxide formation and adherence on an Iron-Cobalt-Nickel Glass Sealing Alloy" which appeared in "Materials Research & Standards", Sept. 1965.

Third treatment: sealing of the assembly of glass and metal by fusion or softening of the glass so that it wets the decarburized and oxidized metal. The sealing is carried out at a temperature slightly lower than the decarburization/degassing temperature, under a controlled atmosphere.

The treatment atmospheres which are employed must have well-determined water vapour contents since these water vapour contents intervene both as such and in relation in a ratio with the hydrogen content so as to impart to the gas a decarburizing effect, an oxidizing effect, a reducing effect, a neutral effect.

Moist atmospheres for these glass-metal connections are at the present time obtained by a simple bubbling of the gas in a vessel containing water. However, this manner of proceeding has the drawbacks of imposing a dew point which is roughly equal to the ambient temperature, and fluctuations of the dew point by variation of the ambient temperature and of the water level in the bubbler. To obtain dew points higher than the ambient temperature, the water of the bubbler must then be heated and, if it is desired, on the contrary, to obtain dew points lower than the ambient temperature, the water of the bubbler must be cooled or the water-saturated gas must be diluted by a dry gas. Furthermore, to obtain a well-fixed dew point, it is at the present time necessary not only to regulate the temperature of the water of the bubbler, and therefore to employ thermally-insulated baths provided with thermostats, but also to regulate the water level and therefore to employ a level probe coupled with an automatic filling device. An arrangement of this type is costly, but moreover, notwithstanding all these improvements, different drawbacks still subsist:

On one hand, the value of the dew point produced is a function of the geometry of the bubbler (in particular of the water/gas exchange surface area), whence the obligation to determine by calibrating the conditions of operation of each bubbler (heating and dilution) so as to obtain the desired dew points.

On the other hand, in the case where it is desired to change from one dew point to a higher dew point, this change being achieved by heating the bath, presents the drawback of having a long response time.

Lastly, in the case where it is desired to change to a lower dew point, the cooling of the bath presents the same drawback of thermal inertia as above, while the dilution presents the drawback of a change in the total flow when changing from one dew point to the other.

These drawbacks may of course be avoided by a quasi-infinite extension of the water/gas exchange surface area by passing, for example, through a large volume of porous material as described in the article entitled "Advanced gas Moisturizing System for Ceramic processing applications" by F. W. Giacobbe, which appeared in "American Ceramic Society Bulletin", Volume 66, No. 10, 1987, and by conservation of the total flow by readjustment of the flows of moistened gas and dry gas.

However, such a moisturizing system still somewhat lacks flexibility. Its construction is very costly and the problem of thermal inertia when it is desired to change the temperature of the bath, has still not been solved.

SUMMARY OF THE INVENTION

An object of the present invention is to provide equipment which has functions of higher performance and is simple, flexible and cheap. Furthermore, it satisfies the need for processes requiring atmospheres having dew points which are both controlled and variable, which is especially required in the glass-metal connection technique.

The process for producing a glass-metal connection according to the invention comprises the combination of the following measures:

(a) the optional decarburization is carried out under an atmosphere, at a temperature of between 950° C. and 1,150° C., with a hydrogen content of 10% to 99%, a water vapour content of 1% to 8%, and a hydrogen/water vapour ratio greater than or equal to five;

(b) the oxidation is carried out:

either at a temperature of 600° C. to 800° C. with a water vapour content of 8% to 2%;

or at a temperature of 900° C. to 1,100° C. and a water vapour content of 4% to 0.5%; and, in the case of the presence of hydrogen, a water vapour/hydrogen ratio greater than or equal to three and a hydrogen content less than or equal to 1%;

(c) at least one of the atmospheres, which contains water vapour and concerns the decarburization, the oxidation or the sealing, is obtained by a mixture of hydrogen and a quantity of additional oxygen, and optionally a neutral gas such as nitrogen, the hydrogen being in a quantity which is at least sufficient for subsequently obtaining by catalytic reaction the desired water vapour content and, as the case may be, the excess hydrogen content which corresponds to the composition of the required atmosphere.

The applicant is quite aware that the intrinsic principle of the realization by catalysis of a water vapour content in a gas has already been proposed, for example in the article entitled "Reduction of iron oxide by pure hydrogen" by L. Guillet, M. Eudier and Ph. Poupeau which appeared in "Mémoires Scientifiques Revue Métallurgique" No. 7/8, 1967, in which it is proposed to employ, in a study of the reduction of iron protoxide, either pure hydrogen, or mixtures of hydrogen, water vapour and argon.

However, the applicant finds that, notwithstanding the widespread knowledge of the concerned chemical reaction and of the possibility of achieving it by catalytic reaction, no application on an industrial scale in glass-metal sealing has been proposed up to the present time, despite the difficulties of obtaining such moist atmospheres according to the aforementioned techniques and despite the particularly attractive effect of the solution applied in accordance with the invention of the technique in question, where the reproducibility and the precision of the operational conditions of manufacture are primordial.

The catalyst employed in the process according to the invention is advantageously so chosen as to permit an immediate and complete reaction of the oxygen at an ambient temperature with a residual oxygen content lower than 10 vpm. A catalyst of this type having an energetic autonomy which may be employed is palladium on a support of alumina which is capable of treating an hourly flow up to about 5,000 to 10,000 times the volume of the reactor. This type of catalyst generally requires no prior heating of the gas and moreover does not involve a sequence for starting up the reactor with an initial rejection of gas to the open air.

According to another variant of carrying out the invention, the additional oxygen is initially present in the nitrogen, which is raw nitrogen obtained by separation of air by adsorption or permeation.

BRIEF DESCRIPTION OF THE DRAWINGS

The features and advantages of the invention will moreover be apparent from the following description given by way of example with reference to FIGS. 1 to 4 which diagrammatically represent four embodiments of the invention.

a flowmeter 31 for regulating the flow of the mixture of nitrogen ($N_2$) and hydrogen ($H_2$);

a supply pipe 32 having a flowmeter 33 for regulating the flow of oxygen ($O_2$);

a catalytic chamber 29 for producing water vapour.

There is in this way achieved the supply of a plurality of furnaces in parallel and it is possible, for a given $N_2/H_2$ mixture, to employ different dew points from one furnace to the other.

Figure 1:
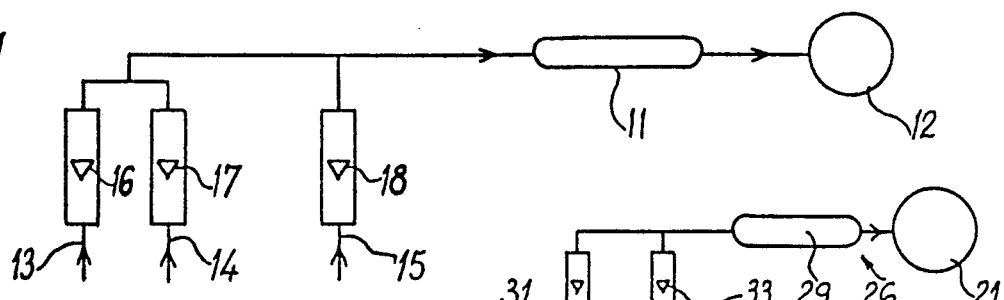
FIG. 1 represents a simplified embodiment in which the three gas constituents, nitrogen ($N_2$), hydrogen ($H_2$), oxygen ($O_2$) are conducted to a catalytic chamber 11 and thence to a furnace 12 through supply pipes 13 for the nitrogen, 14 for the hydrogen, 15 for the oxygen, each pipe 13, 14 and 15 including a float-type flowmeter 16-17-18 equipped with a regulating valve which permits regulating the flow. In this way it is easily possible to use, by a simple regulation of the flows, higher or lower dew points at the ambient temperature.
Figure 3:
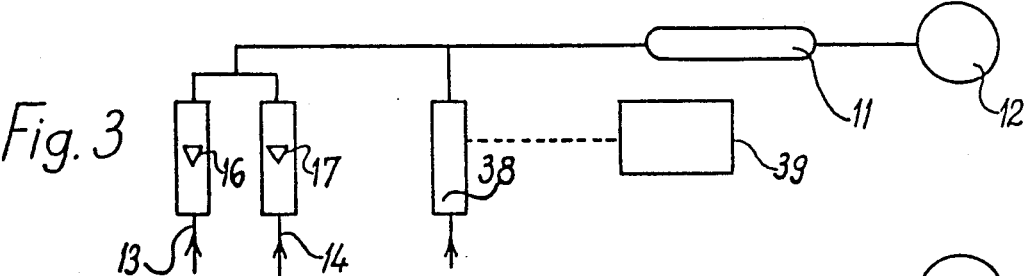

In FIG. 3, which is a variant of FIG. 1, where like elements are designated by like reference numerals, a higher stability of the dew point is assured by obtaining a particularly stable flow of oxygen which is reached with an apparatus 38 of the mass flow rate regulating type equipped with a control 39.

Figure 4:
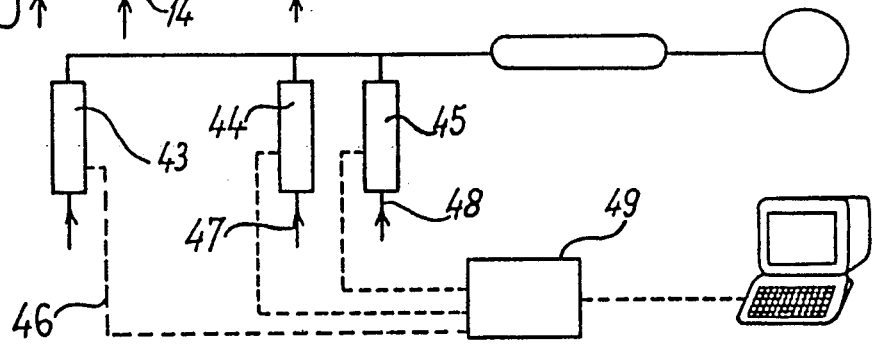

In FIG. 4, three mass flow regulators 43, 44 and 45 are employed in the nitrogen pipe 46, the hydrogen pipe 47 and the oxygen pipe 48, coupled with a device 49 controlled by a computer, whereby it is possible to dynamically control the dew point by means of an automatic control of the flows. It is in this way easy to program a dew point profile simultaneously with a thermal profile while conserving a constant total gas flow.

It is of course possible to envisage any combination of these different embodiments.

Some examples of the use of atmospheres will now be given as applied to glass-metal sealing.

FIRST EXAMPLE

Figure 2:
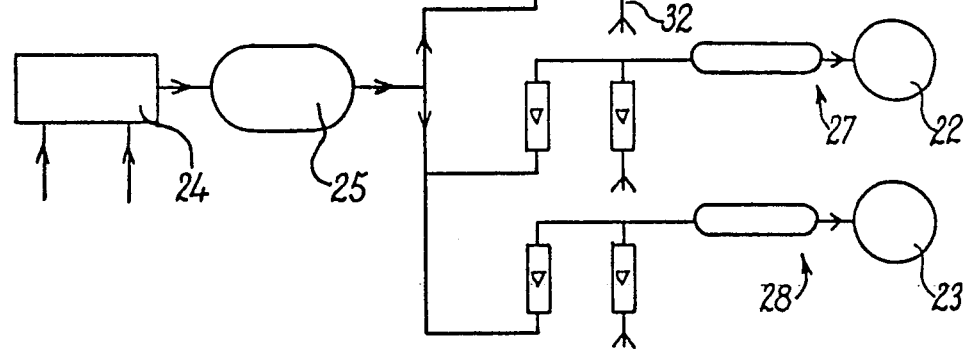
In FIG. 2 which concerns a common supply for a plurality of furnaces 21, 22, 23, ... a premixing of nitrogen ($N_2$), hydrogen ($H_2$), is first of all accomplished in a mixer 24 and thereafter conducted to a plurality of stations of utilization after passage through a common buffer chamber 25. Each supply line 26, 27, 28, ... comprises.

The use of an atmosphere having a dew point controlled for the decarburization and the degassing of an alloy based on Fe, Ni and Co:

To decarburize at 1,050° C. an alloy based on iron, nickel (29%), and cobalt (17%), the device shown in FIG. 2 is employed. This version, which employs solely float-type flowmeters, was chosen because the precision as concerns the dew point obtained by means of float-type flowmeters is sufficient for the decarburization step. The flowmeters employed have a precision equal to 2% of their full scale. They are so chosen that the measured flows are located at about halfway in the scale.

The purpose is to obtain a nitrogen ($N_2$), hydrogen ($H_2$), water vapour ($H_2O$) decarburizing atmosphere comprising 40% hydrogen and 4% water vapour, the remainder being nitrogen. This water vapour content is largely sufficient to permit the decarburization of the metal, while the ratio $H_2/H_2O$ is high enough to prevent its oxidation. The use of a mixer and a buffer chamber permits supplying a pluality of decarburization furnaces and the possibility of operating in a range of different flows. The invention was thus employed for four different values of injected flows 1 cu.m/h, 3 cu.m/h, 10 cu.m/h and 25 cu.m/h.

The decarburizing atmospheres are obtained from a primary mixture of nitrogen and hydrogen issuing from the mixer.

The composition of the mixture, bearing in mind the precision of the mixer, is adjusted to:

56%±1% nitrogen $N_2$

44%±1 hydrogen $H_2$

A measurement of moisture carried out on this mixture reveals a water vapour content less than 10 ppm (dew point $<-60°$ C.).

The nitrogen-hydrogen mixture is conducted to the buffer chamber which permits supplying a plurality of furnaces. The total flow is divided into a plurality of individual flows, each one being controlled by a flowmeter relating to each furnace.

In front of each catalytic chamber there is added to each individual flow of nitrogen-hydrogen an oxygen flow equal to 2%+0.08% of this nitrogen and hydrogen flow. The precision as concerns the oxygen flow is equal to that provided by the float-type flowmeter of the oxygen line.

When passing over the catalyst, all the oxygen reacts with a part of the hydrogen to form the water vapour. Thus the calculated values of the relative proportions of the gas constituents at the outlet of each catalytic chamber are the following:

56% ± 3.1% nitrogen ($N_2$)
40% ± 3.1% hydrogen ($H_2$)
4% ± 0.4% water vapour ($H_2O$)
a few ppm of $O_2$ A checking of these contents was effected by means of take-offs at the outlet of each catalytic chamber: the hydrogen content is measured by a chromatograph, the water vapour content by a hygrometer having a cooled mirror provided with a probe for high dew points, while the oxygen content is measured by an analyzer having an electrolytic cell.

| Analyzed species | $H_2$ | $H_2O$ | $O_2$ |
|---|---|---|---|
| d = 1 cu.m/h | 39.5% ± 0.2% | 3.94% ± 0.05% | <5 ppm |
| d = 3 cu.m/h | 41.6% ± 0.2% | 4.21% ± 0.05% | <5 ppm |
| d = 10 cu.m/h | 40.3% ± 0.2% | 3.97% ± 0.05% | <5 ppm |
| d = 25 cu.m/h | 39.2% ± 0.2% | 4.09% ± 0.05% | <5 ppm |

Bearing in mind the experimental uncertainties, the measured contents fully conform to the calculated contents. This example permits illustrating the facility with which the dew point is obtained, the latter being produced by adjustment of the proportion of oxygen, i.e. by a simple regulation of the flows. Furthermore, the correspondence between the calculated values and the measured values shows that, in order to obtain a given dew point, it is sufficient to adjust the flows to the calculated values. Consequently, no calibration is necessary.

SECOND EXAMPLE

The use of an atmosphere having a controlled dew point for the oxidation of an alloy based on iron, nickel and cobalt.

In order to oxidize at 1,000° C. a previously decarburized alloy based on iron, nickel (29%) and cobalt (17%) the arrangement shown in FIG. 3 was employed.

This version with a regulator of the mass flow rate for the oxygen (precision equal to 1% of the full scale) is recommended in this case, since the water vapour content of the mixture injected into the furnace is a critical parameter for the oxidation step: the thickness and the nature of the oxide layer formed must be controlled very precisely, as mentioned by R. P. Abendroth in the article "Oxide formation and adherence on an Iron-Cobalt-Nickel Glass Sealing Alloy" which appeared in "Materials Research and Standards", Sept. 1965, and by J. McCormick and J. Zakraysek in the article "A Metallographic Test for Glass-to-metal Seal Quality" which appeared in Ann. Proc. Reliability Phy. Syrupos 17th in 1979.

The object is to obtain 1 cu.m/h of oxidizing atmosphere $N_2$, $H_2$, $H_2O$ with 2% water vapour and a hydrogen residue of 0.5%, the remainder being nitrogen. The ratio $H_2O/H_2$ (4) thus chosen permits a controlled oxidation of the metal.

This oxidizing atmosphere is obtained from a primary mixture of 975 l/h of nitrogen and 25 l/h of hydrogen. The composition of the 1,000 l/h of this primary mixture is therefore:

$N_2 = 97.5\% \pm 0.2\%$ $H_2 = 2.5\% \pm 0.2\%$

A measurement of the moisture in this mixture reveals a water vapour content lower than 10 ppm (dew point $<-60°$ C.).

There is added to this first mixture a flow of oxygen of 10 l/h. As this flow is measured by a mass flow rate regulator, the precision is +0.2 l/h.

In passing through the catalytic chamber, all the oxygen reacts with the hydrogen in excess and forms water.

The values of the gas flows expected at the outlet of the catalytic chamber are the following:

975 l/h of nitrogen ($N_2$)
5 l/h of hydrogen ($H_2$)
20 l/h of water vapour ($H_2O$)

namely a total of 1,000 l/h.

This result illustrates one of the advantages of the invention: whatever the desired water content, the overall flow remains constant (1,000 l/h in this case).

Bearing in mind the uncertainties as concerns the gas flows, the relative calculated proportions of the gas constituents are the following:

$N_2 = 97.5\% \pm 0.3\%$
$H_2 = 0.5\% \pm 0.15\%$

```
H2O = 2.0% ± 0.1%
O2  = 0%
```

A check take-off at the outlet of the catalytic system permitted the analysis of the gas mixture for the purpose of checking the content of the different contituents:

```
H2  = 0.58% ± 0.1%
H2O = 2.04% ± 0.03%
O2  < 5 ppm
```

Bearing in mind the experimental uncertainties, the measured contents fully conform to the calculated contents. Consequently, no calibration of the apparatus is necessary.

Furthermore, the use of a mass flow rate regulator for the oxygen permits an easy control of the stability of the dew point.

We claim:

1. A method of bonding together a glass part and a metal alloy part, said metal alloy part comprising iron and nickel, comprising the following successive steps:
   subjecting said glass part and said metal alloy part to an oxidation phase under a first atmosphere which is substantially inert and contains from 2 to 8% of water vapor and less than 1% of hydrogen at a first temperature of from 600° to 800° C.;
   bonding said glass part and said metal alloy part together under a second atmosphere at a second temperature greater than the first temperature,
   wherein at least said first atmosphere is obtained by a catalytic reaction of a mixture of hydrogen and oxygen in proportions selected so as to obtain the desired content of water vapor and hydrogen.

2. The method according to claim 1 further including the preliminary step of subjecting said glass part and said metal alloy part to a decarburizing phase under a third atmosphere containing from 10 to 99% hydrogen, from 1 to 8% of water vapor, and a ratio of hydrogen/water vapor of not less than five;
   wherein said third atmosphere is obtained by catalytic reaction of a mixture of hydrogen and oxygen in proportions selected so as to obtain the desired content of water vapor and hydrogen.

3. The method according to claim 1 wherein the ratio of water vapor to hydrogen is not less than 3.

4. The method of claim 10 wherein said first atmosphere contains nitrogen, and the gaseous mixture subject to catalytic reaction contains nitrogen, hydrogen, and oxygen.

5. The method of claim 4 wherein said oxygen in the gaseous mixture is initially present in the nitrogen mixed with hydrogen, said nitrogen being raw nitrogen obtained by separation of air by adsorption or permeation.

6. The method of claim 1 wherein said catalytic reaction is achieved at ambient temperature with a catalyst having an energetic autonomy, said catalyst containing palladium on an aluminum substrate, the final content of oxygen in the resulting processing atmosphere being less than 10 vpm.

7. The method of claim 2, wherein said catalytic reaction is sequentially conducted in a single reactor for producing successively at least said first and third atmospheres.

8. A method for bonding together a glass part and a metal alloy part, said metal alloy part comprising iron and nickel, which comprises the following successive steps:
   subjecting said glass part and said metal alloy part to an oxidation phase under a first atmosphere is substantially inert and contains from 0.5 to 4% of water vapor and less than 1% hydrogen, at a first temperature of from 900° to 1100° C.;
   bonding said glass part to said metal alloy part under a second atmosphere at a second temperature which is greater than said first temperature,
   wherein at least said first atmosphere is obtained by catalytic reaction of a mixture of hydrogen and oxygen in proportions selected so as to obtain the desired content of water vapor and hydrogen.

9. The method of claim 8 further including the preliminary step of subjecting said glass part and said metal alloy part to a decarburizing phase under a third atmosphere containing from 10 to 99% of hydrogen, from 1 to 8% of water vapor, and a ratio of hydrogen/water vapor of not less than five, wherein said third atmosphere is obtained by catalytic reaction of a mixture of hydrogen and oxygen in proportions selected so as to obtain the desired content of water vapor and hydrogen.

10. The method of claim 8 wherein the ratio of water vapor to hydrogen is not less than 3.

11. The method of claim 8 wherein said first atmosphere contains nitrogen, and the gaseous mixture subject to catalytic reaction contains nitrogen, hydrogen, and oxygen.

* * * * *